Figure 6:
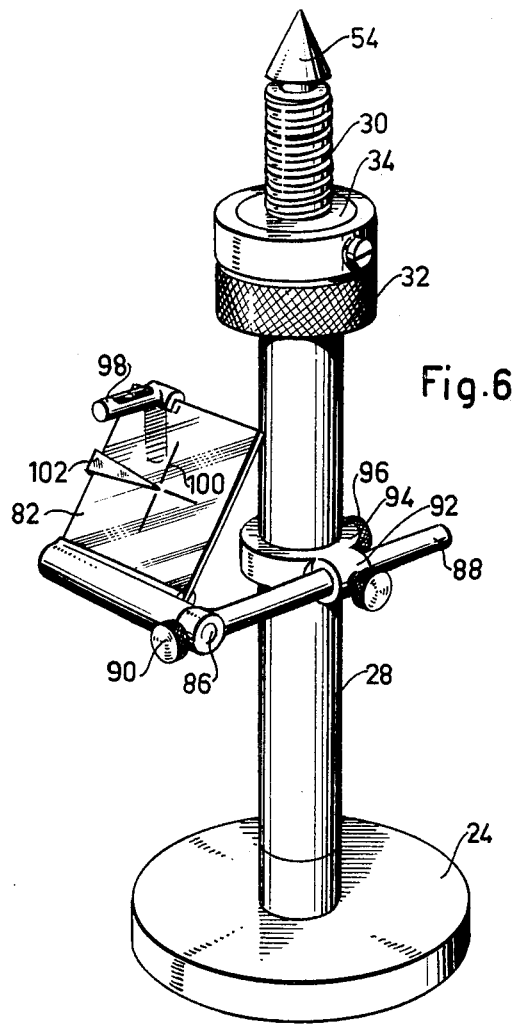

June 15, 1965  R. M. F. JEANSSON ETAL  3,188,741
APPARATUS FOR MEASURING THE DISTANCE BETWEEN FIXED POINTS
Filed April 19, 1962  3 Sheets-Sheet 1
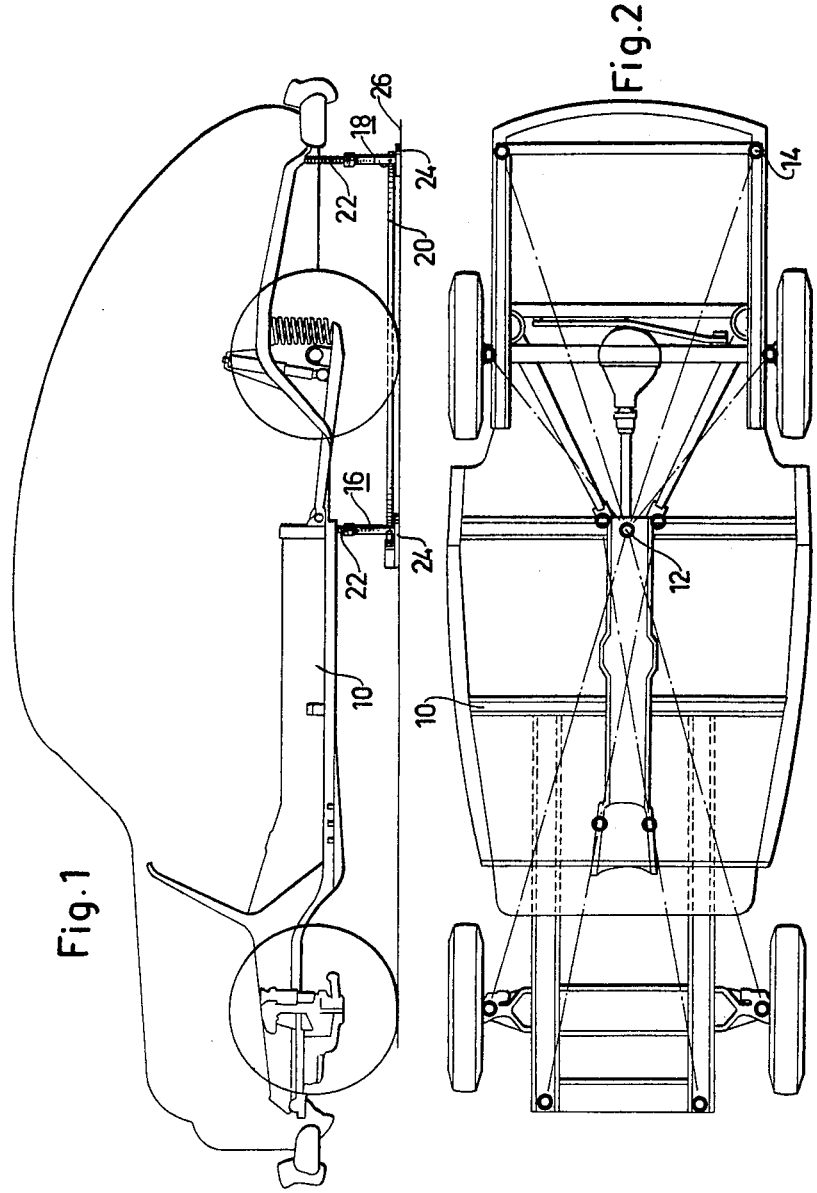
INVENTORS
RUDOLF MARTIN FABIAN JEANSSON
ULF OTTO LENNART THOMÉE
By Young & Thompson
ATTYS.

June 15, 1965　　　R. M. F. JEANSSON ETAL　　　3,188,741
APPARATUS FOR MEASURING THE DISTANCE BETWEEN FIXED POINTS
Filed April 19, 1962　　　　　　　　　　　　　3 Sheets-Sheet 2
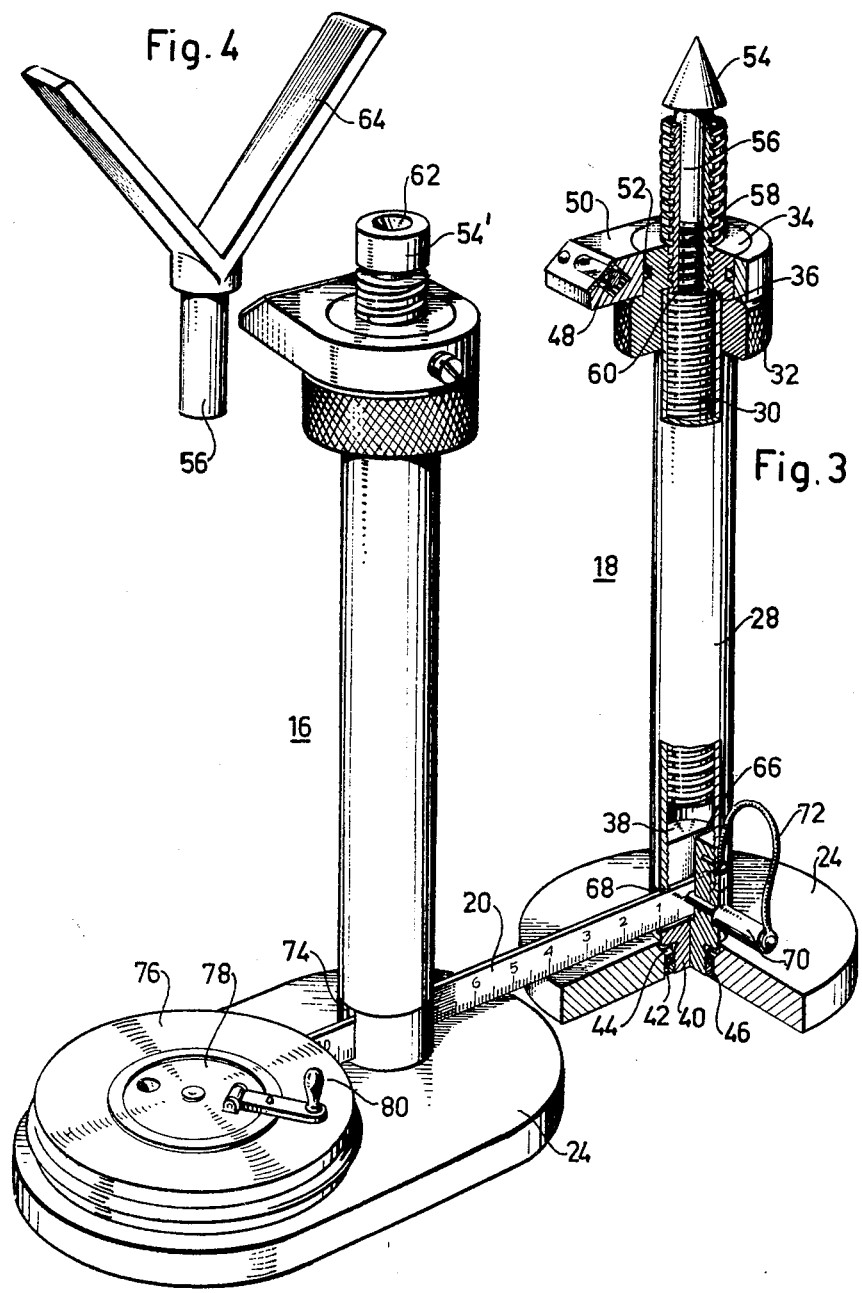
INVENTORS
RUDOLF MARTIN FABIAN JEANSSON
ULF OTTO LENNART THOMÉE
BY Young & Thompson
ATTYS.

June 15, 1965   R. M. F. JEANSSON ETAL   3,188,741
APPARATUS FOR MEASURING THE DISTANCE BETWEEN FIXED POINTS
Filed April 19, 1962   3 Sheets-Sheet 3

INVENTORS
RUDOLF MARTIN FABIAN JEANSSON
ULF OTTO LENNART THOMÉE
BY Young T Thompson
ATTYS.

United States Patent Office 3,188,741
Patented June 15, 1965

3,188,741
APPARATUS FOR MEASURING THE DISTANCE BETWEEN FIXED POINTS
Rudolf Martin Fabian Jeansson, Korsbarsvagen 14, Stockholm, and Ulf Otto Lennart Thomée, Ymsenvagen 3, Johanneshov, Sweden
Filed Apr. 19, 1962, Ser. No. 188,723
Claims priority, application Sweden, Oct. 23, 1961, 10,489/61
2 Claims. (Cl. 33—138)

On the frame or framework of motor vehicles there are provided so-called fixed points between which checking measurements can be taken. Such checking measurement can be necessary in connection with the manufacture or after repairs, for instance in order to ascertain that the wheel axles make exactly right angles with the longitudinal axis of the car or that the wheels are assuming correct mutual positions. As a matter of fact, the technical condition of the frame or framework of the car is primarily essential to the question whether the roadholding qualities of the car and the ability of control comply with the demands on safety of traffic. A checking measurement may also be useful or necessary in order to find out whether the vehicle after having been in operation for a certain time has been subjected to damages resulting in some kind of deformation of the frame or framework. In operation, the vehicle can be subjected to heavy stresses in the event of collisions, such as when the vehicle runs into a ditch or is overloaded or is travelling on very irregular roads, such as roads damaged by frost, with the result of permanent distortion or other deformation. Defects of this kind may be difficult to be observed with the naked eye, whereas reliable information can be obtained by accurately taken checking measurements of the distance between fixed points.

The fixed points which usually are located on the lower side of the vehicle may coincide with control holes, rivet heads, securing bolts or the like. As a rule, the producers furnish a diagram for each car model with specifications of the exact positions of the fixed points, the correct distances between these points, and the permissible tolerances. In most cases, these tolerances do not exceed 1 to 2 mm. for a distance of about 3 m.

Measurement of the exact distance between two fixed points would not involve any problem if it could be taken directly between the fixed points by means of a graduated rule or measuring tape. A motor vehicle commonly has protruding parts, however, such as a crank case, gear case, reverse gear, exhaust gas system, braces and axles, which are located on the line to be measured between various fixed points and render impossible direct measurement. The conventional method of measurement with the use of plumb lines for marking the projected positions of the fixed points on the base on which the vehicle stands and then measuring the distance on the base is considerably time-wasting. It seldom results in correct measurements, especially if the base is not entirely plane. Further, such method of measurement usually requires two operators.

The object of this invention is to provide an apparatus for measuring or checking the distance between fixed points, especially between fixed points on a motor vehicle where the shortest line between said points is obstructed by protruding parts. This device avoids the above-named inconveniences. The invention also includes a device or unit forming a part of said apparatus and adapted to be engaged at one of the fixed points. In its broadest aspect, the invention is characterized in that the apparatus comprises two units adjustable and lockable in positions which define two parallel lines through the fixed points or in positions set at an interval equal to the distance between the parallel lines, and a member for measuring the distance between said parallel lines. This measurement can then easily be effected at points between which the protruding parts are not obstructing.

The imaginary parallel lines may be established in different ways. Each unit may comprise a stand adapted to be fastened between the fixed point and a fixed surface, such as the floor surface on which the vehicle or the like provided with the fixed points is standing. In this case, each unit may define a vertical line which is the connecting line between the fixed point and a point on the stand, the last-named point being located vertically below the fixed point. The stand is advantageously provided with an extensible upright which readily can be fastened between the fixed point and the fixed surface and adjusted such that its axis extends in a vertical direction. In this case the axis of the upright is the imaginary line from which the measurement can be taken. However, it is usually more practical to take the measurement not from the axis of the upright but from a point on the upright, which point is located at a constant distance from the axis, preferably on the circumference of the upright.

Sometimes the fixed points are located at different heights above the fixed plane or floor, but nevertheless the distance therebetween may be checked by measuring of the distance between the vertical lines, the latter distance being equal to the projected distance between the fixed points on said fixed plane or floor. This checking is possible where the manufacturer has defined the projected distances.

In order to facilitate adjustment of the upright in vertical position after the upright has been inserted between the fixed point and the fixed surface, the stand may comprise a resilient member resulting in that the fastening action will be yielding and that the upright, while maintaining its engagement with the fixed point, can be set in the desired position.

A water-level or other instrument capable of indicating a horizontal, vertical or other reference plane or line may be used for setting the upright of the stand in a vertical position. The adjustment can be facilitated and made more rapidly if such instrument is provided on the upright of the stand.

Manipulation of the upright is facilitated if the upright is provided on and supported by a plate such as to be substantially vertical when the plate is placed on a horizontal base. To render possible adjustment in vertical position, the upright is advantageously angularly adjustably connected with the plate so as to be able to be set in vertical position even if the plate rests on a slanting base.

Another way of establishing the vertical lines between which the measurement is to be taken consists in the provision on each of the units of a mirror which can be adjusted at an angle of 45° with respect to a horizontal plane. The mirrors are placed below the fixed points between which the distance is to be checked. If the mirrors are adjusted such that a vertical ray of light from one of the fixed points is reflected by the mirror located below said fixed point toward the point where a vertical ray of light from the other fixed point falls on the corresponding mirror, the distance between said vertical rays of light will be equal to the actual distance or the projected distance between the fixed points. The mirrors may be provided with suitable adjustable marks between which the measurement can be taken.

Figure 5:
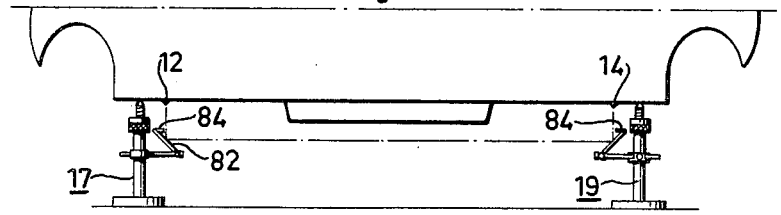

Additional features of the invention will appear from the following description of embodiments illustrated in the drawings. FIG. 1 is a lateral view and FIG. 2 a view from below of an autocar. FIG. 3 is a perspective view of an embodiment of the measuring apparatus with one of the units partly shown in section to illustrate parts provided within the stand. FIG. 4 is a perspective view of a detail. FIG. 5 is a lateral elevation of a second embodiment of the invention with the device in position for measuring in connection with a diagrammatically illustrated vehicle, and FIG. 6 is a perspective view of one of the measuring units of the second embodiment.

Referring to the drawings, numeral 10 denotes a vehicle having a plurality of fixed points which in FIG. 2 are indicated by small circles. An apparatus for measuring the distance between two of these fixed points 12 and 14 is shown in FIG. 1 in position for measurement. In general, the measuring apparatus comprises two units 16 and 18, each for one of the fixed points 12 and 14, respectively, and a measuring member illustrated in the form of a measuring tape 20 for measuring the distance between points on the two units 16 and 18. The units 16 and 18 can be adjusted so as to have exactly the same distance from each other as the distance between the fixed points 12 and 14. Each unit comprises a stand having an extensible upright 22 supported by a plate 24 to be placed on the floor 26 or other base on which the vehicle is standing. The stand is to be placed with the top end of the upright centered on the fixed point and with the upright standing exactly vertically. The stand is provided with means for locking the upright in this position before the measurement is taken. The members required for this purpose are illustrated in detail in FIG. 3 which shows the first embodiment of the invention.

The extensible upright consists of an internally smooth tube 28 and a screw 30 which preferably has square threads and is inserted into the upper end of the tube. This upper end is surrounded by a turnable guide sleeve of a nut 34 which engages the screw 30. The nut has a shoulder 36 abutting against the top end of the tube 28 so that the nut can be used for adjusting the screw when the screw has to be moved more or less out of the tube 28. Fixed within the lower end of the tube 28 is a stud 38 having a reduced end portion 40 which extends downwards into a hole in the plate 24 of the stand. Mounted on the portion 40 of the stud is an elastic O-ring 42 between a flange 44 of the plate of the stand and an annular nut 46 screwed onto the lower end of the portion 40 of the stud. The circumference of the end portion 40 is slightly rounded. As a result thereof and due to the elastic O-ring 42, the tube 28 can be slightly angularly adjusted relative to the plate 24 of the stand. In principle, the connection between the tube 28 and the plate 24 of the stand may be termed a ball joint having a limited degree of movement.

Provided on the stand is a horizontal indicating instrument in the form of a level 48 mounted in a ring 50 which can be turned on the nut 34. The nut 34 as well as the ring 50 are centered with respect to the axis of the tube 28 and nut 30. A friction ring 52 may be inserted in a groove of the nut 34 and cooperates with the ring 50 so as to retain the ring in the adjusted angular position relative to the nut.

In order to facilitate adjustment of the top end of the upright with respect to the center of the fixed point in consideration, the upper end of the screw 30 may be provided with a gauge point for engagement with the fixed point. The gauge point may consist of a cone 54 the base of which is centrally connected with a pin 56 centrally displaceable in a bore of the screw 30. A spring 58 inserted between the pin 56 and the bottom 60 of the bore keeps the base of the cone 54 at a distance above the upper end of the screw 30 when the spring is not compressed. A gauge point of the type indicated is suitable if the fixed point is in the form of a hole. However, if the fixed point is in the form of a projection, such as a head of a rivet, it is suitable to use a "gauge point" of the type shown to the left in FIG. 3. Here the cone is replaced by a head 54′ having a depression 62 in its upper surface for the rivet head or the like. In certain cases, the take-up member at the fixed point may be an angular member 64 of the type shown in FIG. 4.

The tape 20 for measuring the distance between the uprights of the stands extends at one end through a slot 66 in the stud 38 and through diametrically opposite apertures 68 in the tube 28 of the stand 18. This end of the measuring tape can be locked in exact position in the stand 18 by means of a pin 70 which may be connected with the stand by means of a cord 72 or the like member. The measuring tape passes through a similar diametrical slot in the stand 16 and can outside this stand be wound on a spool 78 in a case 76. A crank 80 is provided for turning the spool. The case 76 is secured to the bottom plate of the stand 16 which for this reason is larger than the bottom plate 24 of the stand 18.

The measuring apparatus described with reference to FIGS. 1 to 4 is manipulated substantially in the following manner:

The stands 16 and 18 are placed on a fixed base right below the fixed points 12 and 14, the distance between which is to be measured. By turning the nut 34, the upright of the stand is extended so as to move the take-up member toward the fixed point. Upon turning of the nut 34, the screw 30 which is axially displaceable but not rotatable relative to the tube 28, for example by means of a longitudinal slot and threaded plug as shown in FIG. 2 of U.S. Patent No. 1,784,574, is moved upwards out of the tube. The upward movement of the screw comes to an end after the take-up member 54 has been slightly forced downward into the axial bore of the screw and the spring 60 has been consequently compressed. Thereupon the upright 28 is set in exactly vertical position by means of the level 48 which can be adjusted in different positions around the upright 28 upon turning of the ring 50. The adjustment is made by displacing the plate 24 of the stand and, consequently, the lower end of the upright 28 until the level indicates the vertical position. This adjusting movement is rendered possible due to the articulated yielding connection between the plate 24 and the upright 28 of the stand, said connection being formed by the portion 40 of the stud and the O-ring 42. After both stands 16 and 18 have been adjusted in this manner, they are locked by further tightening of the nuts 34 whereupon the measuring tape 20 is drawn out of the case 76 and its free end is inserted through the apertures 68 of the stand 18 to which it is locked by means of the pin 70. The hole in the tape 20 for the pin 70 is advantageously located such that the zero point of the scale of the measuring tape 20 coincides with the outer edge of the upright 28 of the stand when the tape is locked by the pin 70. The distance can be found out most simply by reading the scale of the tape at the corresponding outer edge of the other stand 16, provided of course that the uprights of both stands have exactly the same diameter at the passageways for the tape. It is obviously possible to accomplish the reading in other ways. For instance, the pin 70 may be introduced in a hole of the type at the zero point of the scale, in which case the upright of the other stand 16 may have a central opening opposite the place where the tape passes the upright. The edge of this opening may be provided with an index that marks the axis of the upright. A magnifying lens may be provided in the opening for improving the accuracy of reading.

In the embodiment illustrated in FIGS. 5 and 6, each stand 17 and 19 is provided with a mirror 82 which by means of a horizontal indicating instrument, such as a level 84, can be adjusted so as to make an angle of exactly 45° with a horizontal plane. If the two mirrors are adjusted below the two fixed points 12, 14 such that vertical rays of light from the fixed points fall on the mirrors on a common horizontal line, as shown in FIG. 5, the distance between the fixed points can be measured by measuring the distance between these lines. The measurement may be facilitated by marks provided on the mirrors which marks may be adjustable so as to indicate the points where the rays of light fall on the mirrors.

In the detailed construction shown in FIG. 6 the upright 28 of the stand, the nut 34 and its guide sleeve 32, the screw 30 and the take-up member 54 may be substantially similar to the corresponding parts of the previous embodiment except for the means for passing and locking the measuring tape. The upright may be rigidly secured to the plate 24 of the stand and need not be articulated thereto. The lower end of the mirror 82 is provided with a pivot 86 which is mounted for turning movement in an arm 88 and can be locked thereto in adjusted angular position by means of a screw 90. The arm or rod 88 is displaceable and lockably mounted in a sleeve 92 projecting from a ring 94 which is turnable and displaceable on the upright 28 and adapted to be locked in adjusted position by means of a screw 96. A level 98 is secured to the upper edge of the mirror so that its longitudinal axis makes an angle of exactly 45° with the plane of the mirror 82. The mirror may be provided with a reticle 100 and/or a mark 102 adjustable in any desired position on the mirror.

The measuring apparatus illustrated in FIGS. 5 and 6 is manipulated substantially in the following manner:

After the stands 17 and 19 have been locked near the fixed points by turning the nut 34 resulting in upward screwing of the screw 30, the mirrors 84 are adjusted below the fixed points 12 and 14 such that the vertical rays of light from the fixed points fall on the respective mirror on a common horizontal line. By means of the level 98, the operator makes sure that the mirrors 82 stand at an angle of exactly 45° with respect to a horizontal plane. The marks 102 are adjusted on both mirrors such that their pointed ends coincide with said points, whereupon the distance between the pointed ends of the two marks can be measured by means of a tape or similar measuring member.

What we claim is:

1. A device to be used in connection with apparatus for checking the distance between two fixed points on frames for motor vehicles, comprising a plate, an upright carried by and angularly adjustable on said plate, said upright including a tubular member and a screw having an axial end bore and extending in said tubular member coaxially therein, a nut fitting to said screw and engaging one end of said tubular member, a spring mounted in said bore and a locating means engaging said spring in said end bore and extending at the top of the upright to be engaged with one fixed point on the frame of the motor vehicle, the device also comprising a water-level instrument for turning around said upright to facilitate adjustment of the latter to a vertical position below said fixed point.

2. Apparatus for checking the distance between two points, the shortest line between which is obstructed by a protruding part, such as between fixed points of a frame of a motor car, comprising two stands each for one of two fixed points and each including a stand composed by an extensible upright and a plate adapted to carry the unit on a supporting surface, such as the floor carrying the motor car, the upright being angularly adjustably connected with said plate, and a water-level instrument guided rotatably on each upright to be turned around the axis of said upright to permit adjustment thereof to a vertical position in alignment with one of the fixed points, the apparatus further comprising a measuring tape collected on one stand and extractable to the other stand for measuring the distance between corresponding points on the stands after adjustment of their uprights to the vertical positions.

References Cited by the Examiner
UNITED STATES PATENTS

| | | | |
|---|---|---|---|
| 720,507 | 2/03 | Van Horn | 33—138 |
| 1,102,792 | 7/14 | Patton. | |
| 1,243,360 | 10/17 | Stoudt | 254—92 |
| 2,632,256 | 3/53 | Will | 33—207 X |
| 2,693,033 | 11/54 | Acker et al. | 33—158 |
| 3,095,651 | 7/63 | Luedicke | 33—158 |

ISSAC LISANN, *Primary Examiner.*

ROBERT L. EVANS, *Examiner.*